Nov. 2, 1965  C. D. TINKER  3,215,542
LIGHT WEIGHT AGGREGATE AND PROCESS OF MAKING IT
Filed Oct. 5, 1962
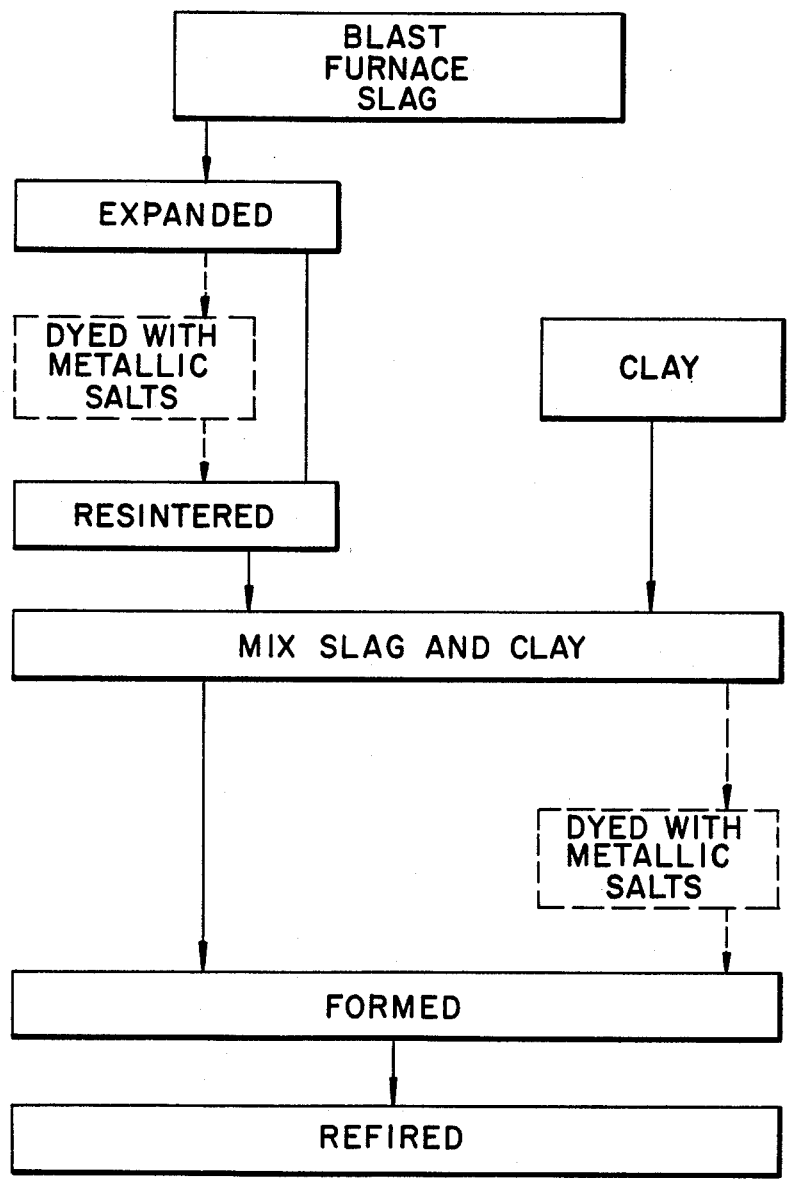
INVENTOR.
CHARLES DEAN TINKER
BY Jerome R. Cox
ATTORNEY

3,215,542
LIGHT WEIGHT AGGREGATE AND PROCESS OF MAKING IT
Charles D. Tinker, Rte. 1, Granville, Ohio
Filed Oct. 5, 1962, Ser. No. 228,608
7 Claims. (Cl. 106—39)

The invention disclosed in this application relate to a fired aggregate for casting with cements, or for mixing with clay for the production of fired ceramic units and to such fired ceramic units and methods of producing such products. My preferred product utilizing the invention hereof is a light weight ceramic product. The preferred embodiment disclosed in this application is such light weight ceramic product.

Heretofore blast furnace slag has been used quite extensively in the manufacture of light weight concrete blocks. A great many of such blocks are manufactured and sold, but in some respects these have not been entirely satisfactory. The slag aggregate used has heretofore been sometimes unstable and often deteriorated over a period of time. I have now discovered a method by which such light weight blast furnace slag may be stabilized by being sintered. I have also discovered a method by which such stabilized light weight blast furnace slag may be utilized in the manufacture of light weight ceramic products somewhat similar to the light weight concrete products heretofore manufactured from such slag, but being ceramic in their nature rather than concrete and possessing distinctive advantages over such concrete products.

These ceramic products may be of varying specific gravities and color depending upon the percentages of the mix and degree of pressure used in forming. They may be of varying textures, either smooth or stippled depending on the pressure used and to some extent the percentage of the mix. They may be dyed by the addition of metallic salts (including metallic oxides) during the process, either before sintering the slag aggregate or after mixing with the clay. The color is controlled by the amount of clay, the kind of clay, and the kind and amount of added metallic salts (including metallic oxides) added as a dye.

In the prior art I understand that clay has been mixed with blast furnace slag, but such attempts have been unsatisfactory because the slag was unstable. In my process I stabilize the slag by sintering. That is, in my process I use a light weight slag which has already been expanded. I stabilize this by sintering.

One of the objects of my invention therefore is the stabilization of light weight blast furnace slag aggregate.

A further object of my invention is the production of a new light weight ceramic product from blast furnace slag and clay.

A further object of my invention is the production of new light weight ceramic products from furnace slag and clay.

A further object of my invention is the production of light weight ceramic products having superior qualities and stability, strength, pressure resistance and soundness.

Further objects and features of my invention will be apparent from a consideration of the following specification and claims in connection with the accompanying drawings.

In the drawings, the figure is a flow sheet illustrating an embodiment of a process of forming a light weight ceramic product in accordance with my invention.

Blast furnace slag is the layer of flux and undesired minerals which is separated from the iron layer in the separation of iron from non-ferrous constituents in the recovery of iron from iron ore by blast furnace processes. It consists essentially of the limestone flux (and/or possibly lime, borax, silica, magnesia, alumina, etc.) and the other non-ferrous minerals of the ore. This layer is treated while still molten with controlled amounts of water, steam and/or compressed air which cools the material and in so doing expands the slag. Other methods of expanding the slag may be used. It may then be broken or ground to form blast furnace slag aggregate. Similarly, if the slag were cooled slowly, it could be reheated and cooled suddenly as by being plunged into the water to expand the slag, and after expansion, suddenly broken and ground. However, cooling and reheating is unnecessary and of no utility and is therefore neither desirable nor usual.

In the practice of my invention and in accordance with the embodiments thereof illustrated herein, I take expanded blast furnace slag aggregate by whatever method it may be obtained. I then sinter at about 2000° F. to stabilize the slag aggregate. This stabilized slag aggregate may then be used for casting with cements, or it may be used by being mixed with clay and fired to form an improved ceramic product as hereinafter more fully described. Thus, the stabilized slag aggregate prepared by my process as described above is useful as a concrete aggregate or as a refractory aggregate.

When mixed with clay and fired to form a fired ceramic unit, the product is useful as:

Fire-proof acoustical tile
Fire-proof architectural tile
External panel wall units
Interior partition wall units
Building brick and block
Roof slabs and panels
Pre-stressed beams and slabs
Drainage pipe
Refractory shapes
Insulating refractory shapes
Refractory aggregate
Refractory insulation
Filter media for filtering gas or liquid
Containers for activated or unactivated filter materials
Catalysts
Catalyst containers By controlling the grain size and the density of the mix, the gravity and porosity of the finished material is constant and reproducible. As the material is not subject to bad effects from steam, it can be used in the filter applications listed above without any difficulty.

In the preparation of the ceramic product I mix the stabilized slag aggregate in proportions by weight of from 10% clay to 90% aggregate to 50% clay to 50% aggregate. At times I add auxiliary fluxes or other materials with the clay. For example, I have added as much as 10% powdered glass, razorite, etc. With some clays this is not needed, but with others it is, in order to get good bonding. I then form either by extrusion or by compression wet or by compression dry in molds or forms. I then fire the formed material by heating in a kiln to about 2000° F.

Example I

As an example of my process, I procured from a manufacturer 10 lbs. of expanded slag aggrigate. This was about ⅙ of a cubic foot. I heated this in a kiln, bringing the temperature up to about 2000° F., taking about 6 hours to bring the material up to that temperature. I then air cooled and thereafter mixed the stabilized aggregate with about 10 lbs. of a slurry of Ohio clay. I formed blocks of the mixture in the shape of small bricks in molds formed under very high pressure. I then fired these blocks in a firing kiln at about 2000° F. for a period of six hours.

The products were clay colored building blocks of light weight, being about 50% of the weight of ordinary bricks, of good strength, and stable against deterioration from age.

Example II

As a further example of my process, I procured from a manufacturer another 10 lbs. of expanded slag aggregate. This was also about ⅙ of a cubic foot. I heated this also in a kiln bringing the temperature up to about 2000° F. over a period of about six hours in order to stablize the aggregate. I then air cooled and thereafter mixed the stabilized aggregate with about 4 lbs. of a slurry of Ohio clay. I formed blocks of the mixture in forms or molds under very high pressure. I then fired these blocks in a firing kiln at about 2000° F. for a period of six hours. The products were blocks of extremely light weight, being about one-half the weight of the blocks of Example I, or about 20–25% of the weight of ordinary bricks, of good strengths and stable against deterioration from age. They were lighter in color than the blocks of Example I.

Example III

As a further example of my process, I procured from a manufacturer another 10 lbs. of expanded slag aggregate. This was also about ⅙ of a cubic foot. I heated this also in a kiln, bringing the temperature up to about 2000° F. over a period of about six hours in order to stabilize the aggregate. I then air cooled and thereafter mixed the stabilized aggregate with about 1 lb. of a slurry of Ohio clay. I formed block of the mixture in forms or molds under very high pressure. I then fired these blocks in a firing kiln at about 2000° F. for a period of six hours. The products were blocks of extremely light weight having a lower specific gravity than the blocks of Example I and Example II. They were of good strength and stable against deterioration from age. They were a light grey in color.

Example IV

As a further example of my process, I procured from a manufacturer another 10 lbs. of expanded slag aggregate. This was also about ⅙ of a cubic foot. I heated this also in a kiln, bringing the temperature up to about 2000° F. over a period of about six hours in order to stabilize the aggregate. I then air cooled and thereafter mixed the stabilized aggregate with about 1 lb. of a slurry of Ohio clay. I formed blocks of the mixture in forms or molds under very light pressure. I then fired these blocks in a firing kiln at about 2000° F. for a period of six hours. The products were blocks of even lower specific gravity and lighter weight than the blocks of Example III. They were porous and irregular in appearance. They were of good strength and stable against deterioration from age. They were light grey in color.

Other blocks were made by similar processes using various percentages of clay and various degrees of pressure in forming. The mixture using 10% clay and light pressure was useful as a filter.

By controlling the grain size of the slag, the amount of the bond of clay and fluxes, and forming pressure, I can control the porosity of the finished material very accurately and can also control the specific gravity or weight thereof.

By selecting the correct grain size, bond clays and fluxes, I have been able to form the finished product by all of the usual forming processes, i.e. pressing, casting, extrusion, etc.

It is to be understood that the above described embodiments of my inventions are for the purpose of illustration only, and various changes may be made therein without departing from the spirit and scope of the invention.

I claim:
1. A process of forming a ceramic which consists of
   (1) sintering expanded blast furnace slag aggregate by bringing it to a temperature of about 2000° F. during a period of about six hours;
   (2) mixing the sintered expanded blast furnace slag aggregate with clay;
   (3) forming the mixture of slag and clay in the desired form; and
       firing the formed mixture of slag and clay at a temperature of about 2000° F.
2. A process of forming a stabilized expanded slag aggregate which comprises
   sintering the expanded slag aggregate by bringing it to a temperature of about 2000° F. during a period of about six hours.
3. A ceramic product which consists of the product of the process of claim 1.
4. The process of claim 1 in which bond clay and fluxes are added, in which forming pressure is used in the forming step, and wherein the grain size of the slag, the amount of bond clay and fluxes is varied from a proportion of ten parts of slag to ten parts clay slurry to a proportion of ten parts of slag to one part of clay surry and the forming pressure is varied from very high to very light in order to control the porosity of the finished material.
5. The process according to claim 1 wherein said firing is carried out over a period of about six hours in a kiln at a temperature of about 2000° F.
6. The process according to claim 2 wherein said clay and said sintered expanded slag are mixed in a proportion of from about 10% clay to about 90% slag to a proportion of about 50% clay to about 50% slag.
7. A stabilized-by-sintering expanded blast furnace slag aggregate which consists of the product of the process of claim 2.

References Cited by the Examiner

FOREIGN PATENTS 3,557 1872 Great Britain.
3,758 1872 Great Britain.

OTHER REFERENCES

Weizelzahl, German application 1,062,608, pub. July 30, 1959 (Kl 80b 5/03) (2 pages spec.).

TOBIAS E. LEVOW, *Primary Examiner*.